United States Patent Office 3,026,124
Patented Mar. 20, 1962

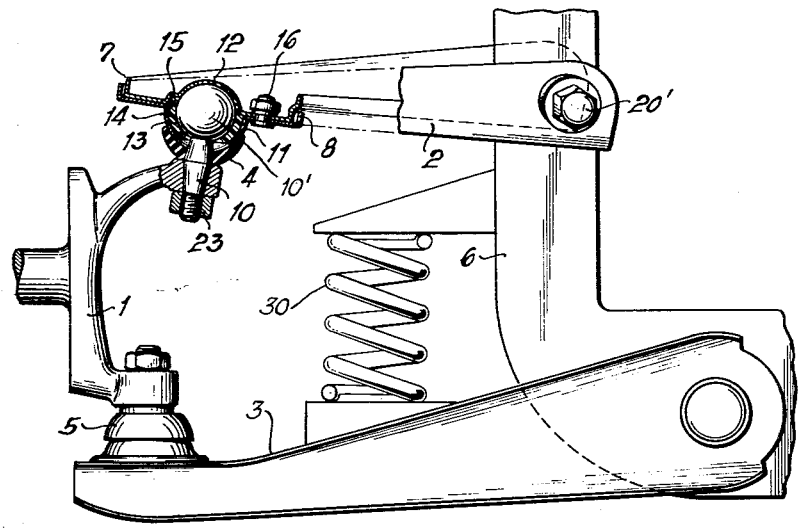
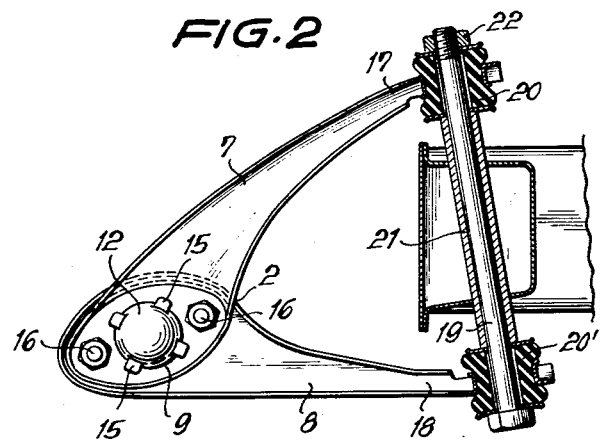

3,026,124
INDIVIDUAL WHEEL SUSPENSION
Wolfgang Eyb, Leonberg, Wurttemberg, Germany, assignor to Dr.-Ing. h.c. F. Porsche K.G.
Filed Feb. 18, 1959, Ser. No. 793,999
Claims priority, application Germany Mar. 14, 1958
10 Claims. (Cl. 280—96.2)

The present invention relates to an individual wheel suspension, especially for motor vehicles provided with guide members extending essentially transversely to the direction of travel of the vehicle which are made of stamped or pressed sheet metal parts and are operatively connected with the wheel carrier or axle spindle by means of ball joints.

Wheel suspensions are known in the prior art in which the transverse guide members are composed of two forged guide parts which, after forging thereof, are machined and subsequently thereto are threadably connected with each other. Such guide members are not only expensive in manufacture thereof but are also relatively heavy in weight and require for assembly thereof, in addition to the securing means for the wheel carrier member, special means such as spacer members, bolts and the like.

Furthermore, constructions are known in the prior art in which the guide members including the fork arms are manufactured of a single pressed or stamped sheet metal part. Transverse pivot pins provided with threads serve thereby for the pivotal connection of the guide arm with the wheel carrier whereby, for purposes of compensating inaccuracies in the manufacture and assembly of the guide member with the wheel carrier, an installation has to be provided for the continuous adjustment of the individual parts with respect to each other. As a result thereof, such a suspension is relatively expensive notwithstanding the simple construction of the guide member, and the assembly of such guide member is time consuming itself. Furthermore, the length of useful life of such a wheel suspension is dependent on careful servicing and maintenance at all times.

According to the present invention, these disadvantages of the prior art are avoided by constructing the guide member of two independent fork arms which are adjustable with respect to each other and simultaneously therewith form the housing for the ball joint. As a result of such a construction, a relatively simple, service-free guide member construction is obtained in which a separate housing for the pivotal accommodation of the ball joint is obviated and which furthermore assures a simple assembly and installation of the guide member.

The fork arms are preferably kept adjustable about the axis of the ball joint, i.e., the fork arms are adjustable about a generally vertical axis extending through the ball head and pin portion of a ball joint member and through the centers of recessed bearing supports in the fork arms which enclose the ball head, the arms being thus adjustable to subtend slightly different angles with the free ends spaced different distances apart and the free ends thereof are connected by means of tensioning bolt.

A further reduction in the constructional expenditures may be achieved if the connection of the fork arms with the tensioning bolt takes place by rubber bushings which are clamped between the ends of the arms. The arrangement is thereby so selected in accordance with the present invention that one of the arms forms the socket-like bearing support and the other arm of the guide member the counter-bearing support for the ball head of the ball joint operatively connected with the wheel carrier and that both bearing halves are kept together by two threaded connections. By the use of such an arrangement, a very simple construction of the housing for the ball joint is obtained whereby the number of the threaded connections to be handled during assembly thereof is reduced to a minimum. The ball head is thereby supported at each of the bearing surfaces by the interposition of a cup-shaped bearing-surface member consisting preferably of synthetic material which does not require lubrication, i.e., which is self-lubricating whereby the cup-shaped self-lubricating bearing-surface member is secured against displacement thereof by projections extending into pressed-out portions of the counter-bearing support.

Such a bearing construction assures an unimpaired, unobjectionable operation of the wheel suspension.

Accordingly, it is an object of the present invention to provide a wheel suspension for individaully suspended wheels which obviates the disadvantages of the prior art construction, which is relatively light in weight, composed of two stamped or pressed sheet metal parts that may be manufactured readily and relatively inexpensively, and which facilitates assembly thereof.

Another object of the present invention resides in the provision of an individual wheel suspension for the wheels of motor vehicles which reduces to a minimum the servicing and maintenance requirements thereof.

Still a further object of the present invention is the provision of a ball-type individual wheel suspension for motor vehicles in which the bearing sockets for the balls are formed in a simple manner minimizing the time required for assembly theerof and which at the same time include means made of self-lubricating material to thereby reduce to a minimum the maintenance requirements of the wheel suspension.

These and other objects, features and advantages of the present invention will become more obvious from the following description when taken in connection with the accompanying drawing, which shows, for purposes of illustration only, one embodiment in accordance with the present invention, and wherein:

FIGURE 1 is a partial elevational front view of a wheel suspension with a transverse guide member construction according to the present invention, some of the parts being shown in cross section for purposes of clarity, and FIGURE 2 is a plan view of the transverse guide member shown in FIGURE 1 together with the vehicle parts adjacent thereto, again some parts being shown in cross section for purposes of clarity.

Referring now to the drawing, wherein like reference numerals are used throughout the two views to designate like parts, reference numeral 1 designates a wheel carrier member of any suitable construction known in the prior art which carries thereon, in a manner known per se, a vehicle wheel not illustrated herein and which is appropriately guided at the relatively stationary vehicle part by means of two superposed transverse guide members 2 and 3. The guide members 2 and 3 are pivotally connected with the wheel carrier by means of ball joints 4 and 5 and are pivotally secured at a bearer member 6 of the vehicle body or frame on the side thereof adjacent the frame. The guide member 3 may be spring suspended with respect to the relatively stationary member 6 by a conventional coil spring 30 as seen in FIGURE 1. The guide member 2 thereby consists of two fork-arms 7 and 8 which form also the housing 9 for the ball-shaped pin member 10 of the ball joint 4. The arm 8 thereby forms the bearing support 11 and the arm 7 the counterbearing support 12 for receiving and substantially covering the ball-shaped pin member 10. A cup-shaped member 13 providing a bearing surface and made of self-lubricating synthetic material is inserted between the ball head 10' and the bearing surface 11 whereby the cup-shaped bearing-surface member 13 is provided with projections 14 by means of which it is secured in the radial direction thereof. The projections 14 extend into pressed-out recesses 15 arranged along the periphery of the counter-bearing member 12. The arms 7 and 8 consist of sheet metal members having an essentially U-shaped profile in cross section, include within the region of the ball-shaped pin member 10 an oval enlargement, and are connected thereat with one another by means of two bolts 16. The bolts 16 secure the arms 7 and 8 to each other in their adjusted positions with respect to the generally vertical axis passing through the centers of the bearing recesses 11 and 12 and the ball head 10'. These adjusted positions are attained by the sequence of assembly described hereinafter. The free ends 17 and 18 of the fork arms 7 and 8 are pressed or urged toward each other by means of a tensioning bolt 19. The connection of the tensioning bolt 19 with the guide arms 7 and 8 takes place by the interposition of rubber bushings 20 and 20' which are clamped between the ends 17 and 18 of the arms with the aid of a spacer member 21 by tightening the nut member 22. The spacer 21 surrounds the tensioning bolt 19 and is rigidly connected with the carrier member 6. The spacer 21 has a generally horizontal axis corresponding to the swinging axis of the guide means formed by the arms 7 and 8.

For purposes of assembly of the wheel suspension in accordance with the present invention, the fork arm 8 together with the rubber sleeve 20' associated therewith is placed over the tensioning bolt 19 and the latter is extended through the stationary spacer member 21. The fork arm 7, as well as the associated rubber sleeve 20 is thereupon mounted over the other side of the tensioning bolt 19. The fork arms 7 and 8 are movable with respect to each other during this phase of the assembly, since manufacturing tolerances providing, for example, 0.5 millimeter clearance between the bolts 16 and the sides of the openings in the arms 7 and 8, will be sufficient to permit the necessary adjustment of the arms with respect to each other during such assembly. It is to be noted that the distance between the center of the ball head and the bolts 16 is about one-seventh (⅐) the distance between the ball center and the tensioning bolt 19 so that the ends of the arms 7 and 8 may be moved toward or away from each other a total of approximately 7 millimeters which is sufficient to overcome the problems experienced in prior assemblies and referred to hereinabove. After the pivotal mounting of the sides of fork arms 7 and 8 adjacent the frame 6 has taken place in the manner described hereinabove, the self-lubricating, cup-shaped bearing-surface member 13 and thereupon the ball-shaped pin member 10 are inserted into the bearing member 11. Thereupon, the pin member 10 has to be tightened at the wheel carrier member 1 by means of nut member 23. The fork arm 7 is thereupon placed from above over the arm 8, and more particularly in such a manner that the counterbearing surface 12 thereof surrounds the ball head 10' and that the projections 14 of the bearing-surface member 13 extend into corresponding recesses 15. By thereupon installing the bolts 16, the fork arms 7 and 8 are connected with each other and simultaneously therewith the joint housing 9 is closed thereby. The tightening torque for the bolts 16 and 23 has to be selected in such a manner that the required play within the ball joint is maintained. Prior to completely tightening the bolts 16, the nut member 22 has to be tightened to such an extent that the rubber sleeves 20 and 20' between the ends 17 and 18 of the fork arms 7 and 8 are sufficiently clamped thereat. The disassembly of the wheel guide member in accordance with the present invention takes place in the reverse sequence in a similar manner.

The installation of the wheel guide member in accordance with the present invention is very simple since no special tools, measuring apparatus or the like are required. Consequently, the assembly and installation thereof may be carried out by relatively inexperienced personnel.

While I have shown and described one embodiment in accordance with the present invention, it is understood that the same is not limited thereto but is susceptible of many changes and modifications within the spirit and scope of the present invention, and I therefore do not wish to be limited to the details described and illustrated herein but intend to cover all such changes and modifications as are encompassed by the appended claims.

I claim:

1. An individual wheel suspension, especially for motor vehicles having a relatively stationary part, comprising guide means extending essentially transversely to the driving direction of the vehicle and made of stamped sheet metal parts, means for supporting said guide means on said stationary part for swinging movement about a generally horizontal axis, wheel carrier means, ball joint means having a main generally vertical axis and operatively connecting said wheel carrier means with said guide means, said guide means including two separate fork-arms adjustable in substantially parallel horizontal directions with respect to each other about said generally vertical axis of the ball joint means and simultaneously forming the housing for said ball joint means, said adjustable fork arms being superposed with respect to each other.

2. An individual wheel suspension, especially for motor vehicles according to claim 1, wherein said two fork-arms include means adjacent said ball joint means for adjustably retaining them with respect to each other for purposes of adjustment of said ball joint means, and said supporting means includes clamping means interconnecting the free ends of said fork-arms.

3. An individual wheel suspension, especially for motor vehicles according to claim 1, wherein one of said fork-arms forms a bearing support for said ball joint means and the other fork-arm forms the counterbearing surface thereof for receiving and substantially covering said ball joint means as seen from above.

4. An individual wheel suspension, especially for motor vehicles according to claim 3, further comprising self-lubricating means within said ball joint means and retained therein by one of said fork-arms.

5. An individual wheel suspension, especially for motor vehicles having a relatively stationary part, comprising swinging guide members extending essentially transversely to the driving direction of the vehicle and made of stamped sheet metal parts, a wheel carrier, ball joint means operatively connecting said wheel carrier with said guide members, one of said guide members including two separate, independent fork-arms forming the housing for a respective ball joint means, means providing for adjustment of said fork arms with respect to each other to change the angle subtended therebetween as seen from above, said last-named means comprising bolts extending through said fork arms, the longitudinal axes of said bolts being substantially parallel to the vertical axis of said ball joint means.

6. An individual wheel suspension, especially for motor vehicles according to claim 5, wherein said bolts are disposed on either side of the axis of said ball joint means, and clamping bolt means for connecting the free ends of said fork-arms with each other.

7. An individual wheel suspension, especially for motor vehicles according to claim 6, wherein the free end of each said fork arm has an aperture extending transversely therethrough and said clamping bolt means includes rubber bushing means prestressed within the apertures in the free ends of said arms by said clamping bolt means.

8. An individual wheel suspension, especially for motor vehicles having a relatively stationary part, comprising swinging guide members extending essentially transversely to the driving direction of the vehicle and made of stamped sheet metal parts, a wheel carrier, ball joint means operatively connecting said wheel carrier with said guide members, one of said guide members including two separate, independent fork-arms adjustable with respect to each other to change the angle subtended therebetween as seen from above and simultaneously forming the housing for a respective ball joint means, one of said fork arms forming the bearing member for said ball joint means and the other fork arm the counterbearing member therefor, said counterbearing member being vertically disposed with respect to said bearing member, and means including two bolted connections for retaining together the two bearing halves formed by said two fork arms.

9. An individual wheel suspension, especially for motor vehicles having a relatively stationary part, comprising swinging guide members extending essentially transversely to the driving direction of the vehicle and made of stamped sheet metal parts, a wheel carrier, ball joint means operatively connecting said wheel carrier with said guide members, one of said guide members including two separate, independent fork-arms adjustable with respect to each other to change the angle subtended therebetween as seen from above and simultaneously forming the housing for a respective ball joint means, one of said fork arms forming the bearing member for said ball joint means and the other fork arm the counterbearing member therefor, means including two bolted connections for retaining together the two bearing halves formed by said two fork arms, said ball joint means including a ball head, a self-lubricating bearing surface member in said one fork-arm to support therein said ball head, and said bearing surface member being provided with projections extending into complementary recesses of said counterbearing member to thereby secure the same against displacement.

10. An individual wheel suspension, especially for motor vehicles according to claim 9, wherein said self-lubricating bearing surface member is made of synthetic material.

References Cited in the file of this patent

UNITED STATES PATENTS

| | | |
|---|---|---|
| 2,167,984 | Leighton | Aug. 1, 1939 |
| 2,171,157 | Mathews | Aug. 29, 1939 |
| 2,298,585 | Phelps | Oct. 13, 1942 |
| 2,305,802 | Balz | Dec. 22, 1942 |
| 2,755,116 | Alldredge | July 17, 1956 |
| 2,779,603 | McRae | Jan. 29, 1957 |
| 2,797,930 | Booth | July 2, 1957 |